UNITED STATES PATENT OFFICE.

SIEGMUND RAUDNITZ, OF VIENNA, AUSTRIA-HUNGARY, ASSIGNOR OF ONE-HALF TO EDMUND JOKL, OF SAME PLACE.

PROCESS OF PROTECTING IRON FROM RUST.

SPECIFICATION forming part of Letters Patent No. 507,082, dated October 17, 1893.

Application filed February 13, 1893. Serial No. 462,183. (No specimens.)

*To all whom it may concern:*

Be it known that I, SIEGMUND RAUDNITZ, a subject of the Emperor of Austria-Hungary, and a resident of Vienna, in the Empire of Austria-Hungary, have invented certain new and useful Improvements in the Protection of Iron from Rust, of which the following is a specification.

According to these improvements a protective coating is produced by which the surface of the iron is covered with an insoluble and incorrodible substance. This coating cannot be altered by atmospheric influences and is absolutely insoluble in water, at the same time resisting any degree of heat and cold and firmly covering the surface of the iron so that neither air nor water can penetrate through this coating to the iron beneath. For producing the said coating the oxides of all metals can be used. The oxides of zinc, lead, antimony, aluminium and calcium, are particularly adapted for the said purposes. These oxides are dissolved in a mineral acid such as muriatic acid, nitric acid or the like and mixed with water in the proportion of one part by weight of acid to one hundred parts of water and to this mixture is added one to two parts by weight of tartaric acid, citric acid, or the like. Into this weak solution the iron or steel to be coated is laid or hung for eight hours after which time it is taken out and dried with or without the use of hot air until all the water is evaporated. In this way a visible and firm covering of an insoluble substance is produced, which constitutes a chemical combination between the iron and the oxide which had been dissolved in the mineral acid and tartaric salts. The iron so prepared is then dipped for a short time into a pure hydro-carbon, such as petroleum tar or coal tar free of oxygen, and thereupon taken out and dried in the usual way over a coke fire or by hot air till the hydrocarbon is evaporated. The so-prepared iron may be finally wiped over with a rag soaked in a mixture of graphite and paraffine.

I claim as new—

1. The herein-described process of producing a protective coating upon iron or steel, which consists in immersing the article to be coated in an acid bath containing a metallic oxide dissolved or suspended in a mixture of mineral and organic acid.

2. The herein-described process of producing a protective coating upon iron or steel, which consists in immersing the article to be coated in an acid bath containing a metallic oxide dissolved or suspended in a mixture of mineral and organic acid, then dipping the article into a hydrocarbon, and then rapidly drying the same.

In testimony whereof I have affixed my signature in presence of two witnesses.

SIEGMUND RAUDNITZ.

Witnesses:
 EDMUND JOKL,
 A. SCHLESSING.